United States Patent [19]

Voegtlin et al.

[11] 4,322,204
[45] Mar. 30, 1982

[54] HOT AIR RECIRCULATION BAKING OVEN

[76] Inventors: René Voegtlin, 2, Rue de la Colline, 67200 Oberhausbergen; Philippe Bongard, 17, Rue Roswarg, 67600 Selestat, both of France

[21] Appl. No.: 205,260

[22] Filed: Nov. 10, 1980

[30] Foreign Application Priority Data

Nov. 13, 1979 [FR] France .................................. 79 28406

[51] Int. Cl.³ ............................................. F27B 9/04
[52] U.S. Cl. .................................... 432/152; 34/204; 34/225; 126/19 R
[58] Field of Search ............. 432/144, 152; 126/19 R; 34/204, 225

[56] References Cited

U.S. PATENT DOCUMENTS

| | | | |
|---|---|---|---|
| 3,529,554 | 9/1970 | Tillander et al. | 34/199 |
| 3,633,518 | 1/1972 | Simmons | 126/19 |
| 4,162,141 | 7/1979 | West | 432/152 |

Primary Examiner—John J. Camby
Attorney, Agent, or Firm—Robert E. Burns; Emmanuel J. Lobato; Bruce L. Adams

[57] ABSTRACT

A hot air recirculation oven for baking products of bakeries, Viennese bread bakehouses, pastry bakehouses and the like comprises a baking chamber (2), an open trolley (8) disposable in the baking chamber and having shelves (15, 16) for supporting products to be baked, and means (46, 47) for admitting heated air to the baking chamber so as to sweep over products on the trolley. The baking chamber (2) has at each corner a continuously rotatable cylindrical distributor (52, 53, 54, 55) connected into ducts (46, 47) which direct hot air from a fan (30) to the interior of the cylindrical distributor (52, 53, 54, 55) in order to be diffused into the baking chamber (2) by way of a vertical jet through a slot (62) located in the circumference of the cylindrical distributor.

10 Claims, 3 Drawing Figures

HOT AIR RECIRCULATION BAKING OVEN

FIELD OF INVENTION

This invention relates to a hot air recirculation oven for use in bakeries, Viennese bread bakehouses, pastry bakehouses and the like; in particular the invention relates to an oven having shelves disposed one above the other for supporting the eventually baked products.

BACKGROUND OF THE INVENTION

According to the present state of the art, ovens are already known in which the products are inserted and removed on an open trolley. The trolley inserted into the oven is generally rolled on to a disc which is rotated and disposed at the level of the floor of the baking chamber. In these ovens, the products are baked by a jet of hot air injected constantly through apertures in the side of the baking chamber. This hot air jet is induced, for reheating and recirculation, through apertures in the opposite side of the baking chamber. It thus happens that the air stream deriving from the jet of hot air traverses the trolley from one side to the other horizontally, while the trolley, after being placed on the disc and after the oven door has been closed, is slowly rotated by way of the floor disc, which is driven by a motor so that the trolley rotates about a vertical axis.

Thus, the products disposed on each shelf are baked equally at all points of the rectangle represented by each shelf.

However ovens using this known method for equalising the heat have various drawbacks, particularly having regard to their overall size and energy consumption. In this respect, the inner volume of the baking chamber is more than double the utilised volume represented by the parallelepiped generated by the trolley rotating about its vertical axis. This doubling of the internal volume of the baking chamber is due to the fact that the base of the baking chamber is essentially square, owing to the fact that it contains the rotating disc on which the substantially rectangular base of the trolley is inscribed.

This volume doubling leads to an unprofitable excess energy consumption, which is used on the one hand for raising the initial temperature of the oven, and on the other hand for filling the oven with steam as is necessary at the commencement of baking of each batch of products to be baked.

In addition, the presence of the disc rotating in the base of the baking chamber, and the fact that it is close to the ground in order to prevent the need for the trolley access ramp to be too steep, make correct heating and insulation of the base difficult.

A batch baking oven with hot air control for baking bakery products disposed on an open trolley is also known from U.S. Pat. No. 3,529,554. Baking is performed by a hot air stream supplied to the baking chamber through a plurality of air jets. The baking chamber comprises two parallel walls with a plurality of vertical slots separated from each other. These walls serve as separation elements between an outer chamber and the baking chamber. The two parallel walls are subjected to a reciprocating movement, and the slots move in parallel vertical planes.

According to one modification, the parallel walls are immobile, and with each vertical slot there is associated an injector formed from two vertically extending spaced flat parallel plates. Between the two flat plates there is disposed a roller mounted on a vertical shaft subjected to a reciprocating movement by way of a horizontal connection bar.

In a second modification, the parallel walls comprise vertical seats in which vertical bars having a vertical slot are disposed. One end of each bar is fitted with an horizontal arm connected by a vertical pivot to a connection bar subjected to reciprocating movement.

A rotary sweeping of hot air jets is obtained only with these two modifications.

However, this oven has numerous drawbacks. In this respect, the various means used, namely the slots provided in the mobile walls, the flat plates extending vertically along the slots provided in the fixed walls, and the rotating sets provided with a vertical slot serve only as a passage for the hot air arriving from the outer chamber, by diffusing it into the baking chamber. It is therefore necessary firstly to fill the outer chamber before the hot air can penetrate into the baking chamber. The hot air is blown by a fan, and because of the large volume necessary for filling the outer chamber, the throughput of this hot air fan has to be enormous. To obtain this throughput, it is necessary to incorporate into the oven a fan of such power that it becomes incompatible with the oven.

Moreover, the hot air circulating through the outer chamber must have a pressure sufficient for its passage through the various means in the direction of the baking chamber. The flow rate of each stream of air is very low because this flow is divided among a plurality of slots. Thus, the direction of each stream is only determined in the immediate proximity of the outlet of each slot. Because of this, the products situated in a central position in the baking chamber are not sufficiently heated.

SUMMARY OF THE INVENTION

The general object of the present invention is to obviate these drawbacks, and to provide an oven which ensures correct baking of the products situated in a central position in the baking chamber by hot air jets of large throughput through the baking chamber.

To this end, the present invention provides a hot air recirculation oven for baking products of bakeries, Viennese bread bakehouses, pastry bakehouses and the like, and in particular an oven provided, for the insertion and removal of the products to be baked, with an open trolley carrying plates disposed one above the other and supporting said products, and subjected to reciprocating rotary sweeping by the hot air fed into the baking chamber, characterised in that the baking chamber comprises at each corner a cylindrical distributor subjected to continuous rotary movement, its lower end being open and connected into hot air feed ducts which direct the hot air from a fan device to the interior of the cylindrical distributor, in order to be diffused in the baking chamber by way of a vertical jet through a slot provided along a generating line in the cylindrical distributor.

BRIEF DESCRIPTION OF DRAWINGS

The nature of the invention should be more apparent by reference to the following description of a preferred embodiment which is illustrated by way of non-limitative example in the accompanying drawing, in which.

DESCRIPTION OF PREFERRED EMBODIMENT

Figure 1:
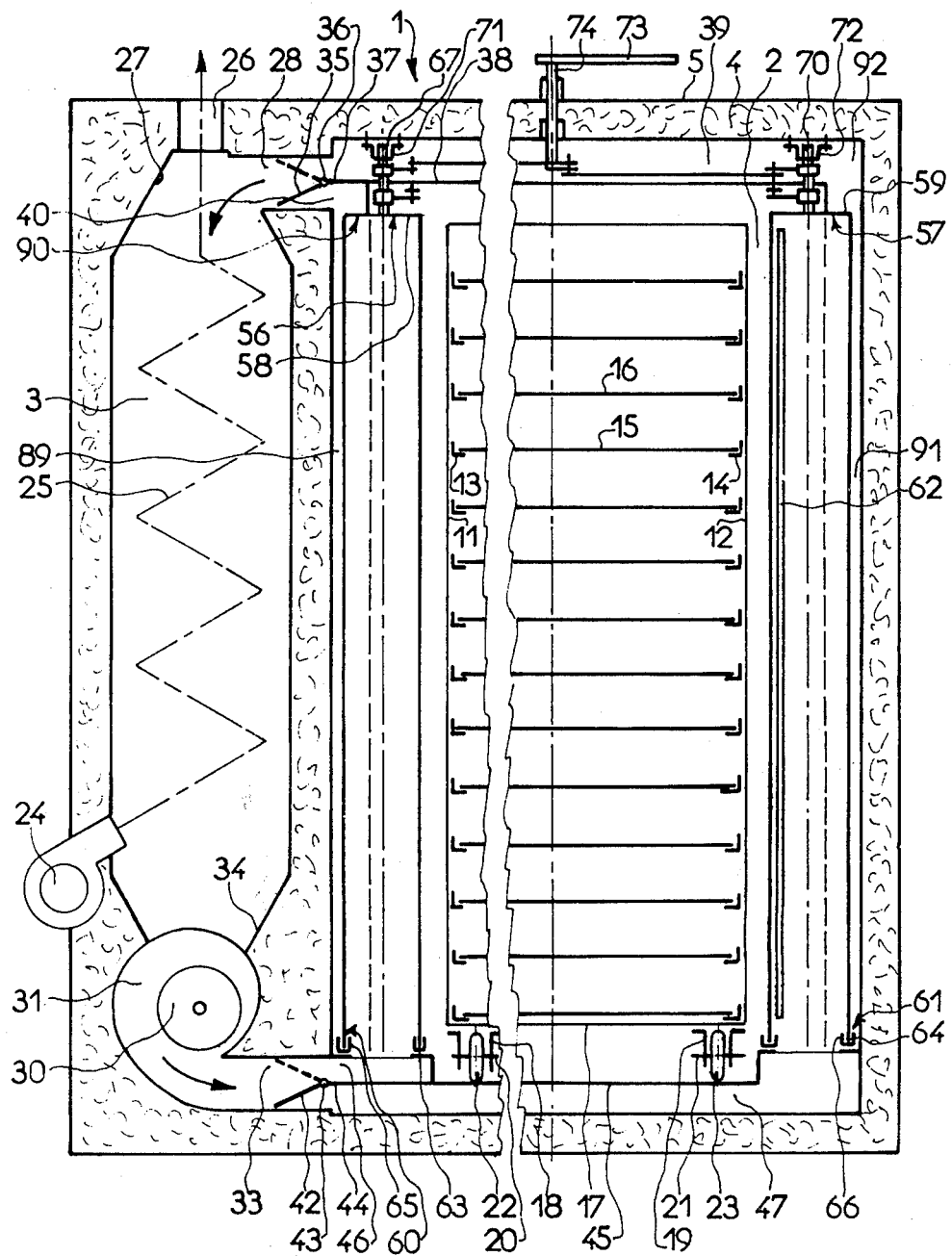
FIG. 1 is a sectional elevation of a hot air recirculation oven according to the invention.
Figure 2:
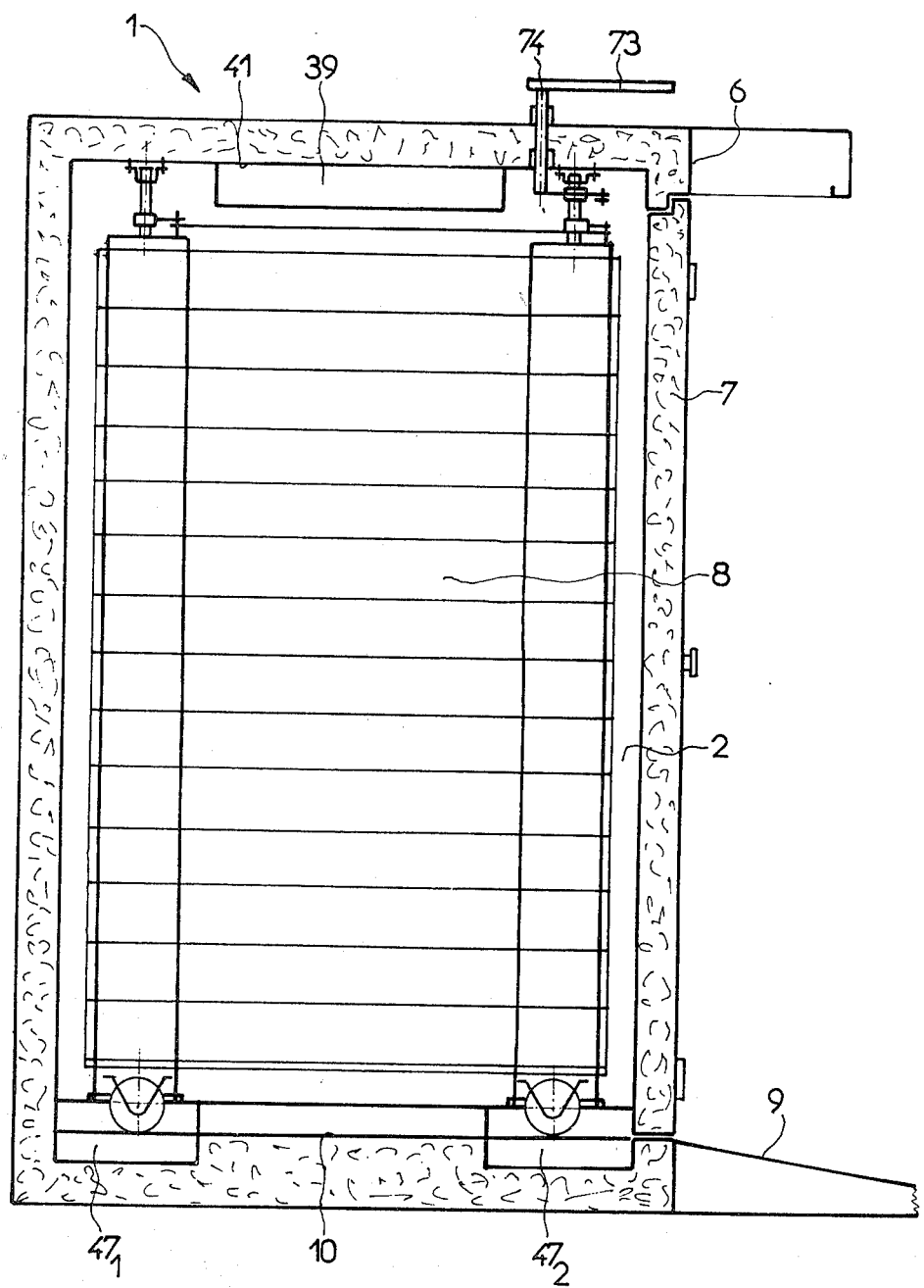
FIG. 2 is a section through the oven seen from the left of FIG. 1.

An oven 1 according to the invention is essentially constituted by a baking chamber 2 and a hot air generator 3. These components are surrounded by insulating material 4 and then with an outer casing 5. The front panel 6 of the oven comprises an insulated door 7 which gives access to the baking chamber 2 for the insertion of a baking trolley 8. After ascending a ramp 9, the baking trolley 8 is disposed on the base 10 of the baking chamber 2. This trolley 8 is in the form of an open rolling stepped structure, the uprights 11, 12 of which are fitted with slide guides 13, 14 on which the shelves 15, 16 containing the products to be baked are mounted. The base 17 of the trolley 8 has forks 18, 19 traversed by a pivot 20, 21 about which a roller 22, 23 rotates to enable the trolley to be moved.

The hot air generator 3 is heated by a burner 24 and is traversed by a circuit containing the products of combustion 25 which leave through a stack 26 preferably disposed at the upper end 27 of the hot air generator 3. In another embodiment, the heating member can equally consist of a bank of electrical heating elements.

The upper end 27 of the hot air generator 3 is connected to the baking chamber 2 by way of an intake aperture 28. The air withdrawn from the baking chamber 2 through the aperture 28 is drawn through the hot air generator 3 by way of two lateral suction ports 29, 30 of a fan device 31, and is then fed to the baking chamber 2 through two delivery ports 32, 33, which connect the lower end 34 of the hot air generator 3 to the baking chamber 2 by way of the fan 31.

The intake aperture 28 comprises an intake flap 35 rotatable about an horizontal axis 33 and disposed at the end 37 of an upper separator 38, to enable two intake ducts 39, 40 to be defined, the duct 39 being situated above the other duct, and lying below the roof 41 of the baking chamber 2.

Likewise, each delivery aperture 32, 33 comprises a delivery flap 42 which rotates about an horizontal axis 43 disposed at the end 44 of a lower separator 45, to enable each aperture 32, 33 to be connected to two superposed delivery ducts 46, 47, the lower ducts $47_1$, $47_2$ being situated below the base 10 of the baking chamber 2.

A rotary distributor 52, 53, 54, 55 is disposed in each of the four corners 48, 49, 50, 51 of the baking chamber 2 to feed hot air jet streams into the baking chamber 2. Each rotary distributor 52, 53, 54, 55 is in the form of a cylinder with its upper end 56, 57 closed by a plate 58, 59, while its lower end 60, 61 is open and is connected into the delivery ducts 46, 47. A slot 62 is provided along a generating line in each rotary distributor 52, 53, through which the hot air jets diffuse. According to a further embodiment, the slots could equally be constituted by a succession of apertures along a generating line. The edge 63, 64 of the lower end 60, 61 moves in a guide element provided with a seal joint 65, 66.

Each distributor 52 to 55 comprises at its upper end a shaft 67, 68, 69, 70 kept rigid with the roof 41 of the baking chamber 2 by means of a bearing 71, 72. The distributors 52 to 55 are subjected to a reciprocating rotary movement through an angle (a). The rotary movement is transmitted to them by a drive element operating a lever 73 in such a manner that it impresses on it a slow continuous to-and-fro movement through an angle (b). By way of an axle 74, this lever entrains a connecting rod 75 connected to a bar 76. The ends 77, 78 of this bar 76 are connected by an axle 79, 80 to a driven connecting rod 81, 82, the end of which rotates the axles 68, 69. The ends of a secondary drive connecting rod 83, 84 are fixed to the axles 68, 69, and rotate the axles 67, 70 by way of bars 85, 86 and a secondary driven connecting rod 87, 88.

A vertical perforated manifold 89, of which the upper end 90 is connected to the lower intake duct 40, is disposed between the distributors 52 and 53. Likewise, a vertical perforated manifold 91, the upper end 92 of which is connected to the upper intake duct 39, is disposed between the distributors 54, 55.

The operation of the oven is as follows:

It will be assumed that at the start of the cycle the intake flap 35 and delivery flaps 42 are in their lowered position. The hot air from the generator 3 is then delivered to the upper delivery ducts 46 into which the open ends 60 of the two left hand rotary distributors 52, 53 are connected.

The hot air traverses the baking chamber 2 from left to right in FIG. 1, the circulation being such that the delivery is made at the rotary distributors 52, 53 and the intake at the upper intake duct 92 by way of the vertical perforated manifold 91.

Figure 3:
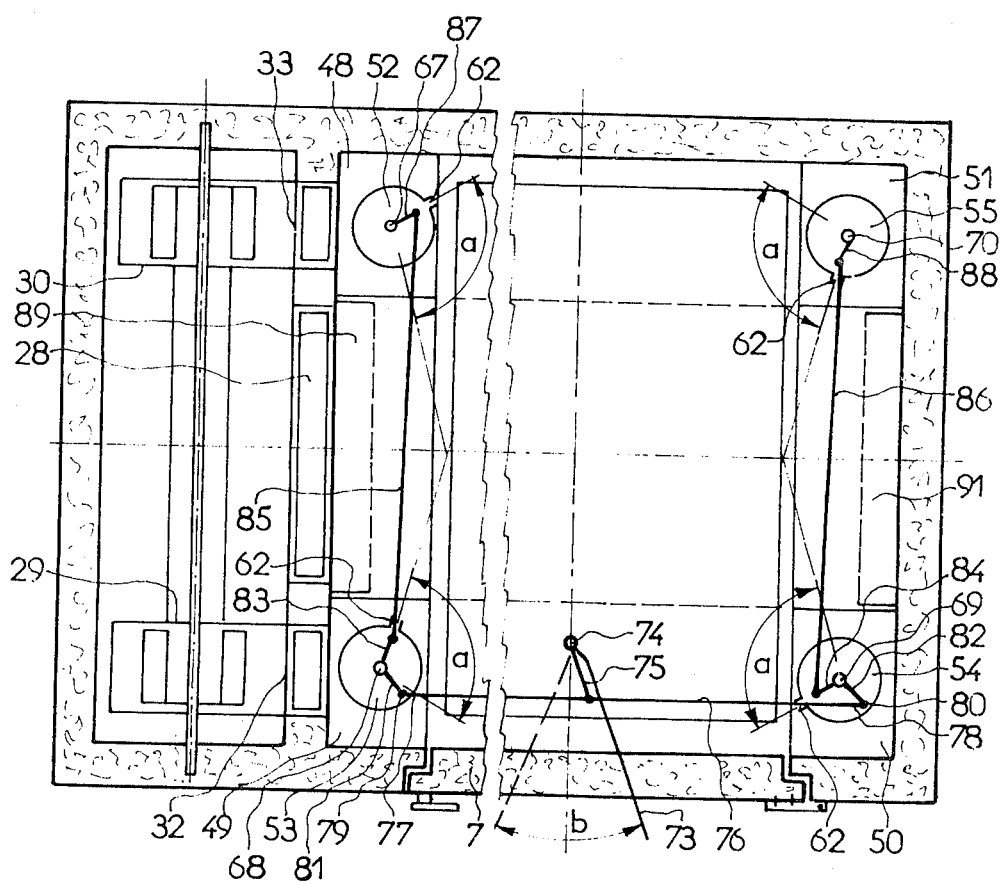
FIG. 3 is a sectional plan view of the oven.

Likewise, it is assumed that at the start of the cycle the lever 73 is in its extreme right hand position and that the injection slots 62 of the left hand rotary distributors 52, 53 are in their extreme rear position (see FIG. 3).

The cycle is commenced. The lever 73 is firstly driven from right to left through an angle corresponding to the angle b, and is then returned from left to right through the same angle, while the intake flap 35 and the discharge flaps 42 remain in their lowered position.

During this first stage, the slots 52 of the left hand rotary distributors 52, 53 rotate from the rear frontwards through an angle a, and then from the front rearwards through the same angle.

In this manner, the baking plates 15, 16 loaded with the products to be baked are essentially heated over their rear left hand quarter and their front left hand quarter by the hot air jet leaving through the slots 62 of the rotary distributors 52, 53 and subjected to a sweeping movement from the rear forwards and from the front rearwards.

At the end of this stage, when the lever 73 returns to its initial position, the intake flap 35 and delivery flaps 42 are rapidly turned into their raised position, which reverses the hot air circulation in the baking chamber 2, the air now being fed from right to left by way of the lower delivery duct 47, the right hand rotary distributors 54, 55, the vertical perforated manifold 89 and the lower intake duct 40.

As the reciprocating movement of the lever 73 continues, the rear right hand quarters and front right hand quarters of the baking plates are now heated as the hot air jets fed through the slots 62 of the front right hand distributor 54 and rear right hand distributor 55 move from the front rearward, the air being drawn in through the vertical perforated manifold 89.

At the end of this second stage of the cycle, the lever 73 having been again returned to its initial position after its second reciprocating movement, the intake flap 35 and the discharge flaps 42 are rapidly rotated downwards, and the same cycle recommences and is repeated without interruption until the end of the required baking time.

In a further embodiment, the rotary distributors 52 to 55 are no longer subjected to a reciprocating rotary movement, but to a continuous rotary movement. The rotary distributors 52 to 55 are partially surrounded by a cylindrical jacket having an angular aperture facing the axis of the trolley. The position of the injection slot 62 in the left hand rotary distributors 52, 53 is offset with respect to the position of the injection slot 62 of the right hand rotary distributors 54, 55. By this means, when the injection slots 62 of the left hand rotary distributors 52, 53 face the angular aperture of their respective cylindrical jacket and inject hot air into the baking chamber 2, the injection slots 62 of the right hand rotary distributors 54, 55 are located inside the corresponding cylindrical jacket, and there is no hot air injection through the two right hand rotary distributors 54, 55. Inversely, when the slots 62 of the left hand rotary distributors 52, 53 become located inside the cylindrical chamber by virtue of the continuous rotary movement transmitted uniformly to the four rotary distributors 52 to 55, the slots 62 of the right hand rotary distributors 54, 55 are located facing the angular aperture of their respective cylindrical jacket, and hot air is injected into the baking chamber 2 by way of the right hand rotary distributors 54, 55.

The number of rotary air jets relating to the aforegoing description is in no way limited. Likewise, the number, the form, the arrangement and the period of discontinuity of action, or likewise the continuity of action of the air jets can be variously modified.

We claim:

1. A hot air recirculating baking oven comprising a parallelpiped baking chamber having a door, an open trolley movable through said door into said baking chamber and having spaced shelves for supporting the products to be baked, and means for introducing hot air into the baking chamber so as to sweep the products on the trolley, said means comprising a hot air distributor in each of the four corners of said baking chamber, each of said hot air distributors comprising a rotatable vertical hollow cylinder having a slot along a generatrix of the cylinder, means for rotating said distributors about their vertical axes, and means for supplying hot air to each of said distributors, such hot air flowing through said slots and being thereby directed onto said products on the shelves of said trolley.

2. An oven according to claim 1, in which vertical perforated exhaust manifolds are provided at opposite sides of said baking chamber between said distributors located in said corners of said baking chamber.

3. An oven according to claim 2, in which said hot air supplying means comprises means for supplying hot air first to the distributors at one side of said baking chamber and then to the distributors at the opposite side of the baking chamber, the hot air being exhausted by the manifold opposite the distributors by which it is supplied, thereby producing an air flow in said baking chamber first in one direction and then in another direction.

4. An oven according to claim 3, in which said hot air supplying means comprises an air heating chamber, air supply ducts leading from said air heating chamber to said distributors and valve means in said ducts for directing hot air from said air heating chamber first to one pair of said distributors and then to another pair.

5. An oven according to claim 4, in which return ducts lead from said exhaust manifolds to said air heating chamber, and in which valve means in said air return ducts are synchronized with said valve means in said air supply ducts.

6. An oven according to claim 5, in which said hot air distributors are closed at their upper ends and said air supply ducts lead from a lower part of said air heating chamber to lower ends of said distributors while said air return ducts lead from upper ends of said exhaust manifolds to an upper part of said air heating chamber.

7. An oven according to claim 1, in which the cylindrical distributors are continuously rotatable in pairs.

8. An oven according to claim 1, in which the cylindrical distributors are continuously oscillated in pairs.

9. An oven according to claim 8, in which means for oscillating said distributors comprises an arm fixed coaxially with said cylinder, linkage connecting the arms of the distributors of a pair and means for oscillating one cylinder of a pair, whereby said oscillation is transmitted by said linkage to the other cylinder of said pair.

10. An oven according to claim 9, in which an arm on one cylinder of each pair is connected by master linkage to an arm on one cylinder of the other pair, means being provided for reciprocating said master linkage to transmit oscillatory movement to all of said distributors.

* * * * *